United States Patent [19]

Verbeke et al.

[11] Patent Number: 5,434,431
[45] Date of Patent: Jul. 18, 1995

[54] RADIATION IMAGE READ-OUT SYSTEM

[75] Inventors: Gentil Verbeke, Edegem; Walter Exelmans, Merksem, both of Belgium

[73] Assignee: AGFA-Gevaert N. V., Mortsel, Belgium

[21] Appl. No.: 147,567

[22] Filed: Nov. 5, 1993

[30] Foreign Application Priority Data

Nov. 25, 1992 [EP] European Pat. Off. ............ 92203640

[51] Int. Cl.$^6$ .............................................. G03B 42/02
[52] U.S. Cl. ...................................... 250/585; 250/588
[58] Field of Search ................................ 250/585, 588

[56] References Cited

U.S. PATENT DOCUMENTS 4,584,482 4/1986 Suzuki et al. .................... 250/459.1

FOREIGN PATENT DOCUMENTS

| 62-246038 | 10/1987 | Japan | 250/585 |
| 1-106032 | 4/1989 | Japan | 250/585 |
| 1-262531 | 10/1989 | Japan | 250/585 |

*Primary Examiner*—Constantine Hannaher
*Attorney, Agent, or Firm*—William J. Daniel

[57] ABSTRACT

In a known method for radiographic imaging, a phosphor sheet capable of stimulation with radiation and carrying stored thereon an image pattern obtained e.g. by an X-ray exposure through a patient's body, is exposed to stimulating radiation, such as a laser beam, which causes the sheet to emit light in the pattern of the stored image and the emitted light is read-out photo-electrically. The stimulating radiation is applied to the sheet as a beam which is caused to scan the sheet linewise as the sheet undergoes relative movement in one direction with respect to the beam by means of galvanometric deflection which deflects the beam in one direction in a scanning step and then in the opposite direction in a retracing step to return the beam for the next scanning step.

In the invention, the sheet is exposed to the beam at a significantly lower intensity level to cause the sheet to emit low level light corresponding to the image pattern. The low level light is read out as low level image signals which are then employed to control the sensitivity with which the light emitted as a result of the scanning step is read out photo-electrically, e.g. the gain utilized for such read-out. The opaque light chopper ordinarily employed to block the radiation beam during the retrace step is replaced with a chopper of limited light transmissivity, e.g. 5-10%, which reduces the intensity of the radiation beam during the retrace step so that the same light source can be used during both the scanning and retrace steps.

7 Claims, 2 Drawing Sheets

RADIATION IMAGE READ-OUT SYSTEM

DESCRIPTION

1. Field of the Invention

The present invention relates to a radiation image read-out system, and in particular to a method for optimizing the final read-out of a radiation image stored in a stimulable phosphor sheet.

2. Background of the Invention

In the field of digital radiography a system has been developed wherein X-rays transmitted by an exposed object (such as the body of a patient) are stored on a photo-stimulable phosphor screen (a PSL system). In the PSL system, a PSL X-ray plate has applied thereto a layer of photo-stimulable luminescent material which comprises a phosphor, for example a europium-activated barium fluoro-halide and a binder. The phosphor has the characteristic that it can be energised to an excited state by X-rays, and can then be stimulated by visible or infra-red light to return to the ground state with the emission of visible light. The stimulating radiation is arranged to have a different wavelength from the emitted light. A PSL plate is potentially re-usable many times. In order to extract the image from the exposed plate, the plate may be transported past a scanning station where a light beam, typically from a laser, scans line-wise across the plate in front of a light guide comprising a bundle of optical fibres. The input ends of this fibre bundle are arranged in a line for the reception of light emitted from the plate, typically at wavelengths close to 400 nm, when the PSL material is stimulated by the laser. The light-guide is arranged to pass the emitted light from the output ends of the fibres to a photo-multiplier tube or other receptor. The result is a storable raster image.

The dynamic range of photo-stimulable storage phosphors is much larger than the dosage range encountered in diagnostic radiology. However, the dynamic range of the electro-optical systems, used to read the stored information, is smaller and it is therefore necessary to match the dynamic range of the electro-optical systems to the exposure received by the phosphor sheet.

In radiography a variety of X-ray dosage levels may be used, and it is preferred to subject the patient to as low a dosage of X-rays as possible. The lowest contrast for a given size of detail is a function of the dosage and diagnostically important information may occur in quite different signal ranges from one radiographic sheet to the next.

As described in U.S. Pat. No. 4,952,806 (Nobufumi Mori) the phosphor sheet is exposed to stimulating radiation causing the sheet to emit light in proportion to the amount of energy stored thereon, and the emitted light is detected to obtain a representative image signal and thereafter the sheet is exposed to erasing light to release the energy remaining thereon, enabling the sheet to be re-used. When the level of components of the image signal, the components corresponding to part of the sheet, exceed a range of signal levels from which information about a radiation image can be detected accurately, the levels of energy stored at the part of the sheet are predicted from how the other components of the image signal, the levels falling within the range of signal values, are distributed. The amount of erasing light is determined based on the predicted levels of energy.

U.S. Pat. No. 4,527,060 (Suzuki et al) describes a readout system for stimulable phosphor sheets in which a preliminary read-out is conducted to analyze the image input information on the phosphor sheet by use of a stimulating radiation beam having an energy lower than the stimulation energy in the final read-out. The image input information from the preliminary read-out is displayed to permit the final read-out and image processing conditions to be set manually or is directly sent to a control circuit for automatically setting them. Preliminary and final read-out sections are formed separately, or a single read-out section is used to conduct both read-out steps.

In European patent application 91203212.5 (Agfa-Gavaert) there is described a method of determining the signal range that is relevant for reproduction. An image stored on the phosphor screen is read out by scanning the screen with stimulating rays, detecting the light emitted upon stimulation and converting it into a digital signal representation. Out of the entire signal range a sub-range that is relevant for diagnosis is extracted by evaluation of a histogram of the image signals. The reproduction is controlled by the signal values within the selected sub-range. In this way the dynamic range of the recording material or of the display device is optimally utilised so that the image quality of the reproduction or the display is enhanced.

In the prior art, such as referred to above, the information, on the basis of which the machine sensitivity is matched to exposure is usually obtained during a "pre-scan". This preliminary scan of an image is carried out with a reduced resolution to save time and with stimulating radiation of reduced intensity to perserve the image signal for the main scan. However, the benefits of acquiring this information is offset by a loss in throughput and increased mechanical/optical complication.

A galvanometer scanner is the preferred deflecting element for raster scanning. The galvanometer is normally oscillated widthwise across the sheet and produces with the relative movement of the sheet with a triangular wave, causing the laser spot to travel across the width of the sheet at constant speed after which the mirror is returned to its starting position as quickly as possible. The latter motion is referred to as "retrace". The laser beam is normally interrupted during the retrace step in order to avoid affecting the information stored on the sheet. A so-called optical chopper, synchronised with the galvanometer motion, is used to do this.

OBJECTS OF THE INVENTION

It is an object of the present invention to provide a means of acquiring advance information about the signal levels to encountered in scanning a photo-stimulable phosphor plate without carrying out a separate preliminary scan and without extra components in the optical path.

STATEMENT OF THE INVENTION

According to the invention there is provided in a radiation image read-out system in which a stimulable phosphor sheet carrying a radiation image stored thereon is exposed to a scanning stimulating radiation beam which causes the sheet to emit light in the pattern of the stored image and the emitted light is photo-electrically read out, the stimulating radiation being deflected into the main scanning direction by means of galvanometric deflection, a method of acquiring information about signal levels to enable the sensitivity of the read-out to be adjusted characterised by exposing the sheet to radiation during the retrace step of the galvanometric deflection.

A galvanometer scanner is the preferred deflecting element for raster scanning using a laser spot because it readily adapts to various sheet formats. The galvanometer may be oscillated to produce a triangular wave, causing the laser spot to travel in a main scanning step in one direction across the width of the sheet at constant speed of for example from 10 to 40 m/s, followed by a return or retrace step in an direction of from 150 to 600 m/s, more preferably from 200 to 400 m/s, while the phosphor sheet is advanced at a speed of from 5 to 20 mm/s.

Preferably, the intensity of the radiation during the retrace step is lower than the intensity of the read-out radiation. It is convenient to use the same light source for the read-out radiation and for the radiation during the retrace step. Where the galvanometric deflection is obtained by use of a galvanometer scanner provided with an optical chopper, synchronised with the galvanometer motion, the optical chopper preferably comprises a light interrupting portion formed of a semi-opaque material, in place of the opaque material usually used, to allow a low level of stimulation radiation to pass there-through during the retrace step. The optical chopper may be in the form of a rotating disc, or segment of a disc. The semi-opaque material through which the laser light passes for the retrace step may be formed of coated glass, plastics or film material, which makes up the segment or a part of the disc. The transmissivity of the semi-opaque light interrupting portion preferably lies between 0.5% and 10%. Given the higher speed of the retrace step across the phosphor sheet, this results in an exposure in the retrace step which is from 0.1% to 5% of the intensity of that in the main read-out step. This level of stimulation is chosen such that it is sufficient to acquire useful information about the image on the stimulable phosphor sheet but insufficient to substantially reduce its information content. The information acquired in this way is preferably used to adjust the gain to be used in the signal channel during the next scan portion of the galvanometer motion.

The phosphor sheet is usually subsequently erased by further exposure to radiation, to enable it to be re-used. The information acquired during each retrace step can also be used to obtain an accurate measure of the X-ray doses to be erased on portions of the image sheet where the X-rays have not been attenuated by the patient, i.e. the maximum image level to be erased, where the signal channel may therefor become saturated with normal stimulation.

BRIEF DESCRIPTION OF THE DRAWINGS

The invention will now be described in more detail, purely by way of example, with reference to the accompanying drawings, in which.

DETAILED DESCRIPTION OF PREFERRED EMBODIMENTS

Figure 1:
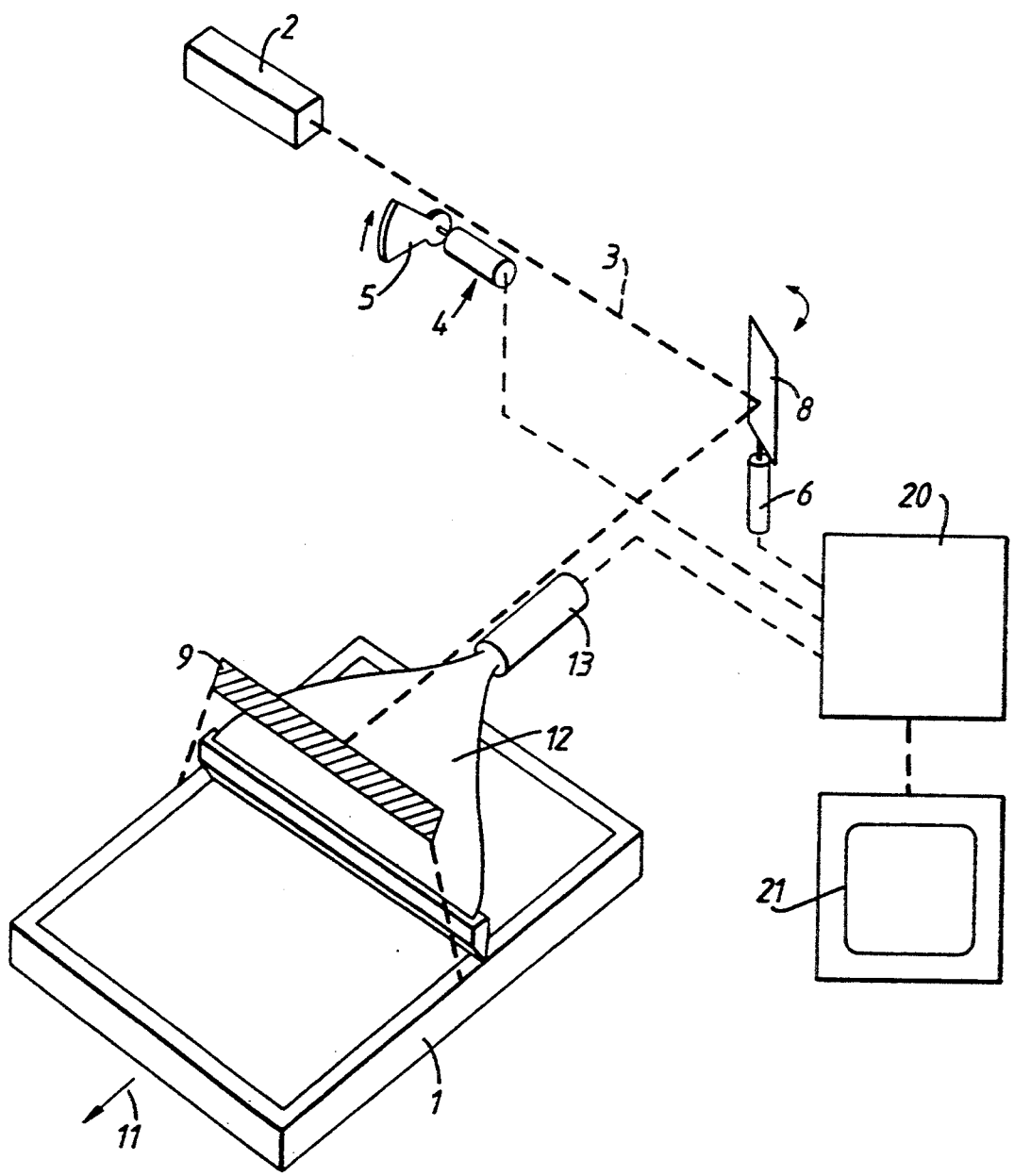
FIG. 1 shows schematically an apparatus for use in the method of the invention.

In FIG. 1, a PSL sheet read-out station is shown. After a stimulable phosphor sheet 1 is exposed to radiation, such as to X-rays, passing through an object to have a radiation image stored thereon, it is sent to the read-out station shown in FIG. 1. A laser beam 3, having a wavelength of 633 nm, is emitted from a helium-neon laser source 2, is directed towards a galvanometer mirror 8. Drive means 6 cause the galvanometer mirror to oscillate across the sheet 1 and produce in conjunction with the relative movement of the sheet in the direction indicated by arrow 11 a triangular wave pattern. A light chopper 4, including a rotating disc segment 5, is positioned to enable the disc segment to interrupt the laser beam pathway during the galvanometer retrace step. The disc segment 5 is made for example of aluminum-coated glass having a light transmissivity of 1% at 633 nm wavelength. The disc segment 5 represents 72° of a circle, to match that proportion of the scanning cycle represented by the retrace step.

Various laser beam focusing devices, known in the art, not shown in the drawings, ensure a uniform beam diameter during scanning of the beam on the phosphor sheet and also ensure that the uniform angular velocity of the reciprocating mirror 8 results in the laser spot travelling across the phosphor sheet at a uniform linear speed. The laser beam 3 is one-dimensionally deflected by the galvanometer mirror 8 and by a plane reflection mirror 9 onto the phosphor sheet 1. The arrangement is such that a spot of laser light, having a full width at half maximum of 60 $\mu$m scans the phosphor sheet at a main scanning speed of 35 m/sec, and a retrace speed of 300 m/sec. Transport means not shown are provided to transport the sheet 1 at a uniform speed of 12.5 mm/sec in the direction of the arrow 11, to enable the whole sheet to be scanned in a uniform manner.

Positioned close to, but behind the scanning line of the laser beam 3 on the phosphor sheet 1, is a light guide 12 which receives light emitted from the phosphor sheet 1 but is shielded from direct exposure to the laser beam 3. The output end of the light guide 12 is positioned adjacent a photo-detector 13, which produces an electrical signal dependent upon the light intensity falling thereon.

Suitable electrical connections are made to pass the output signal from the photo-detector 13 to a computer 20 which serves to control the light chopper 4 and the galvanometer mirror drive 6 and is additionally connected to a display unit 21, such as a VDU screen. Alternatively or additionally the output of the computer 20 is used to produce a permanent record of the raster image.

Figure 2:
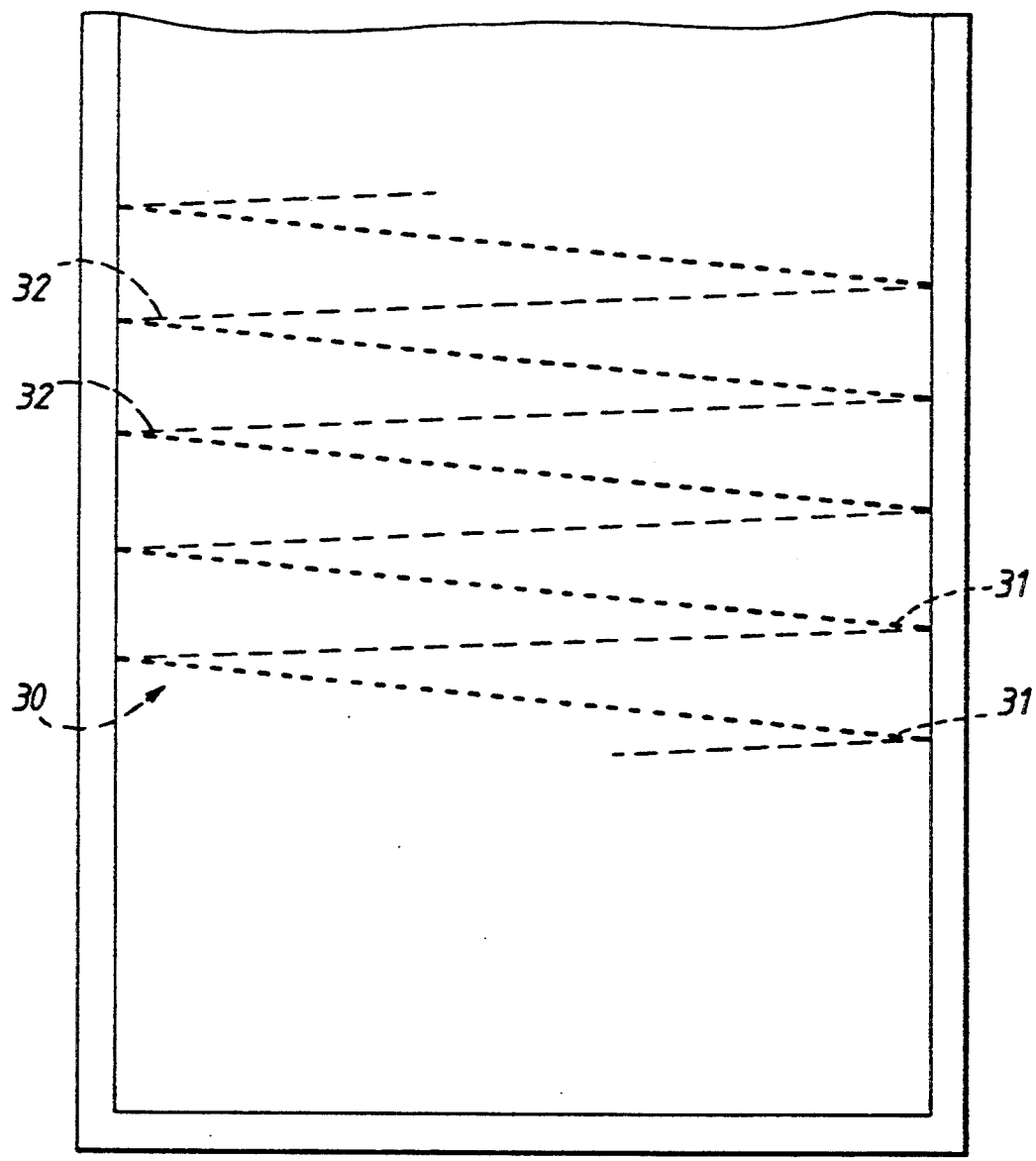
FIG. 2 shows diagrammatically a phosphor sheet during the method of the invention.

The operation of the apparatus shown in FIG. 1 can be understood by a reference to FIG. 2.

FIG. 2 shows the exposed phosphor plate 1. The line 30 illustrates, in an exaggerated manner, the scanning path of the laser spot. This path consists of a main scanning portion 31, which is relatively slow, and a retrace portion 32 which, being relatively fast is at a less oblique angle to the width of the sheet 1.

The method according to the invention works as follows. During the retrace step, a relatively low level of laser light strikes the phosphor sheet. Light emitted from the sheet during this step is detected by the photo-detector 13 and a corresponding pattern of signals is passed to the computer 20. The range of signal strengths received by the computer 20 during this step is determined and, by the use of calculating methods used in the prior art for preliminary scanning, in particular the measurement of maximum and minimum exposure levels by peak detection, a suitable gain is calculated for the next read-out step. The next read-out step then takes place, using full level laser light, and the computer 20 processes the output of the photo-detector 13, using the gain calculated from the previous retrace step, to produce one line of the raster image to be displayed on the display unit 21.

The phosphor sheet is erased by subsequent exposure to radiation, applied in a uniform manner over the whole of the phosphor sheet, at an intensity which is ideally derived from the information acquired during retrace exposure, in particular from the measured maximum exposure level. Typically, the energy required for erasure of a plate having dimensions 35 cm×43 cm is about 300 joules.

We claim:

1. In a radiation image read-out method in which a stimulable phosphor sheet carrying a radiation image pattern thereon is exposed by linewise scanning to a stimulating radiation beam while undergoing a relative movement in one direction with respect to said beam, said radiation exposure causing the sheet to emit light in the pattern of the stored image and the thus emitted light is photo-electrically read out as light signals representing said image pattern, the stimulating radiation beam being deflected by galvanometric deflection from one side of the sheet in a main scanning step in one direction across the sheet and then in a retrace step is returned in the opposite direction to said one side for the next scanning step, the improvement of exposing the sheet as said beam is returned by said galvanometric deflection to the radiation beam at an intensity significantly lower than the intensity of the beam during its main scanning step, to thereby cause the sheet to emit light of lower intensity than the light emitted thereby after the main scanning step, photo-electrically reading out the lower intensity light as low level light signals, and adjusting the sensitivity of the read out of the light emitted during the scanning step in accordance with the thus read-out low level light signals.

2. A method according to claim 1, wherein the galvanometric deflection is obtained by use of a galvanometer scanner provided with an optical chopper, synchronised with the galvanometer motion, and the optical chopper comprises a semi-opaque light interrupting portion.

3. A method according to claim 2, wherein the transmissivity of the semi-opaque light interrupting portion lies between 1% and 10%.

4. The method of claim 1 wherein the light emitted as a result of the main scanning step is read out with an adjustable gain and said gain is adjusted in accordance with the low level light signals to adjust the read out sensitivity.

5. The method of claim 1 wherein the phosphor sheet after the photo-electric read out of the light emitted therefrom as a result of said main scanning step retains a residual image pattern thereon and said residual image pattern is erased by a further exposure to radiation.

6. The method of claim 5 wherein said low level light signals are used to obtain an indication of the maximum intensity of the residual image pattern to be erased.

7. The method of claim 5 wherein the deflection of said radiation beam in said other direction by said galvanometric deflection during said retrace step is carried out at a substantially higher speed than the deflection of said beam in said one direction during said scanning step.

* * * * *